US008113796B2

(12) United States Patent
Marx et al.

(10) Patent No.: US 8,113,796 B2
(45) Date of Patent: Feb. 14, 2012

(54) FUEL DELIVERY MODULE

(75) Inventors: Patrice Marx, Saulnes (FR); Jean Francois Robin, Talange (FR); Rainer Metzen, Hosingen (LU)

(73) Assignee: Delphi Technologies, Inc., Troy, MI (US)

( * ) Notice: Subject to any disclaimer, the term of this patent is extended or adjusted under 35 U.S.C. 154(b) by 422 days.

(21) Appl. No.: 12/441,837

(22) PCT Filed: Oct. 25, 2007

(86) PCT No.: PCT/EP2007/061496
§ 371 (c)(1),
(2), (4) Date: Mar. 18, 2009

(87) PCT Pub. No.: WO2008/049900
PCT Pub. Date: May 2, 2008

(65) Prior Publication Data
US 2010/0047090 A1 Feb. 25, 2010

(30) Foreign Application Priority Data
Oct. 27, 2006 (EP) .................................... 06255558

(51) Int. Cl.
F04B 17/00 (2006.01)
(52) U.S. Cl. ..................... 417/360; 417/420; 417/423.7; 417/423.14
(58) Field of Classification Search .................. 417/360, 417/632, 410.1, 420, 423.3, 423.7, 423.14
See application file for complete search history.

(56) References Cited

U.S. PATENT DOCUMENTS

| 3,259,072 | A | 7/1966 | Carpenter |
| 3,658,444 | A | 4/1972 | Rhodes et al. |
| 3,871,797 | A | 3/1975 | Igarashi et al. |
| 4,566,866 | A | 1/1986 | Kemmner |
| 5,378,111 | A | 1/1995 | Christopher |
| 5,551,843 | A * | 9/1996 | Hauser .......................... 417/234 |
| 5,762,481 | A | 6/1998 | Oi |
| 6,241,489 | B1 * | 6/2001 | Lewin et al. ............... 417/410.1 |
| 2004/0108779 | A1 * | 6/2004 | Boettger et al. ................. 310/89 |
| 2006/0078466 | A1 * | 4/2006 | Colin et al. .................. 422/68.1 |
| 2007/0065314 | A1 * | 3/2007 | Nagata et al. .............. 417/423.1 |

FOREIGN PATENT DOCUMENTS

| DE | 2411235 | 9/1974 |
| DE | 4314453 | 11/1994 |
| EP | 1400331 | 3/2004 |

OTHER PUBLICATIONS

PCT International Search Report dated Feb. 14, 2008.

* cited by examiner

Primary Examiner — Bumsuk Won
(74) Attorney, Agent, or Firm — Thomas N. Twomey

(57) ABSTRACT

A fuel delivery module comprising a substantially fuel tight housing having a fuel inlet and at least one fuel outlet, a fuel pump located in a first chamber defined within the housing, said fuel pump comprising an electric motor and a positive displacement pump assembly drivingly connected to the motor for pumping fuel from the fuel inlet to said fuel outlet, at least a substantial part of said housing being formed from a plastic material. Electrical conductors are connectable to the electric motor within a high pressure region of the first chamber, said electrical conductors being arranged to extend within a wall region of the housing from a high pressure region of the first chamber to a low pressure region before exiting the housing from said low pressure region.

18 Claims, 7 Drawing Sheets

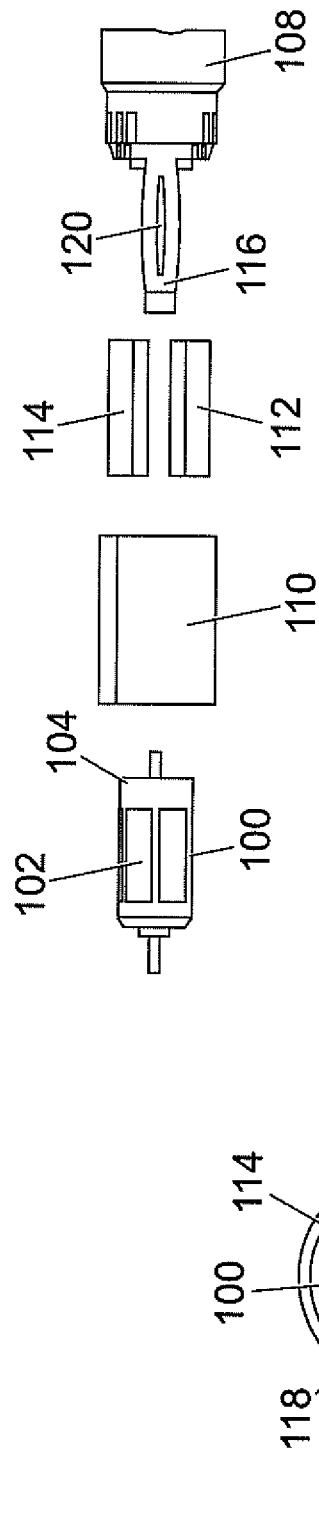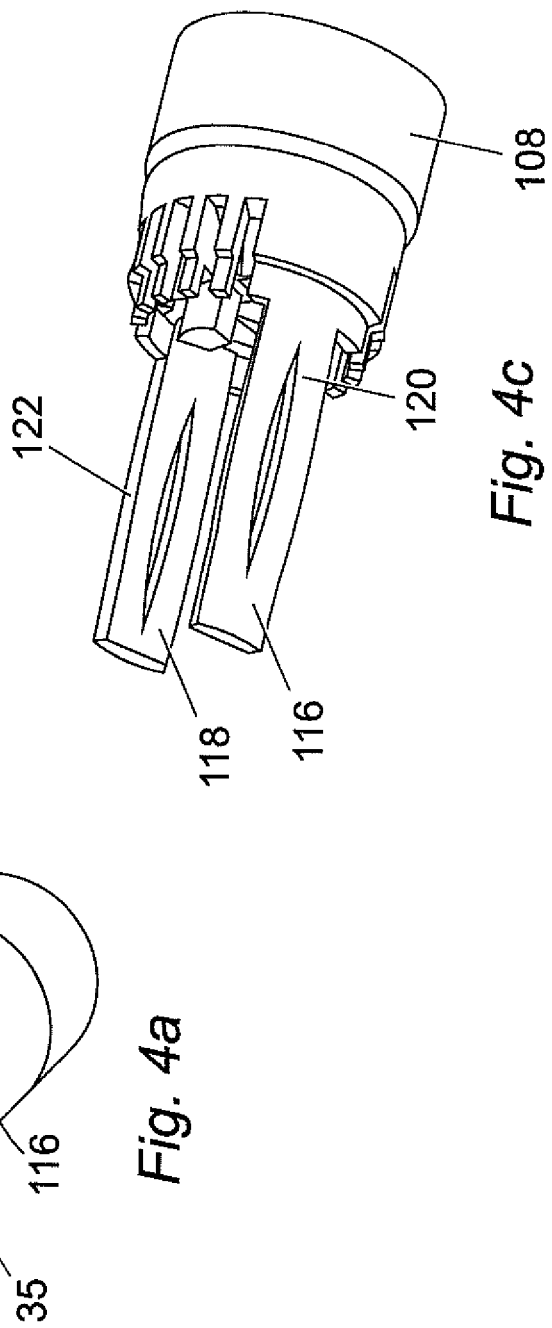
Fig. 4a  Fig. 4b  Fig. 4c

FUEL DELIVERY MODULE

TECHNICAL FIELD

The present invention relates to a fuel delivery module for a vehicle.

BACKGROUND OF THE INVENTION

Typically fuel is delivered from a fuel tank of a vehicle to the fuel system of an engine by means of a fuel pump. The fuel delivery circuit also typically includes a fuel filter downstream of the fuel pump and a fuel pressure regulator to regulate the fuel pressure downstream of the pump. Smaller vehicles, such as motorcycles, scooters and snow mobiles, and small watercraft, such as jet skis, have often relied on more simple fuel delivery systems, often using gravity to deliver fuel from a fuel tank to the fuel system, e.g. one or more carburettors, of the engine. Fuel injection systems are commonly replacing carburettors in such small vehicle applications, requiring higher fuel pressure than can be provided by a simple gravity feed. Furthermore, packaging constraints and alternative placements of the fuel tank may not provide sufficient gravity head between the fuel tank and the fuel system of the engine to permit the use of such gravity feed method of fuel delivery.

Typically in larger vehicles, such as cars or trucks, the fuel pump is provided within the fuel tank and the size, weight and packaging of the fuel delivery system is not particularly constrained due to the overall volume of the fuel tank and the size of the vehicle. However, in smaller vehicle applications, the small volume of the fuel tank and difficulties in providing access to the interior of the tank can makes the location of the fuel pump within the tank disadvantageous as it causes a significant reduction in the overall fuel capacity of the fuel tank and difficult assembly and maintenance procedures. Furthermore, strict packaging and weight constraints place limitations on the design, size and weight of inline fuel delivery components for use in such applications, rendering systems typically used for larger vehicles, such as cars, unsuitable. Also, due to the lower cost of such small vehicles, the cost of manufacturing and assembly of the fuel delivery system becomes more critical.

To improve fuel delivering, it has been proposed, for example in U.S. Pat. No. 3,658,444, a fuel delivery module comprising a fuel tight housing having a fuel inlet and at least one fuel outlet, a fuel pump located within a first chamber defined within the housing, said fuel pump comprising an electric motor and a positive displacement pump assembly drivingly connected to the motor for pumping fuel from the fuel inlet to said fuel outlet, at least a substantial part of said housing being formed from a plastic material, wherein one or more electrical conductors for supplying electrical energy to the electric motor exit through a wall region of the housing surrounding or adjacent a lower pressure region of the first chamber to be connectable to an electrical connector.

There are still some drawbacks with the existing fuel delivery module such as an assembly process too complicated and some sealing problems.

SUMMARY OF THE INVENTION

In order to improve the above mentioned fuel delivery module, the present invention provides a fuel delivery module characterized in that the electrical conductors are connectable to the electric motor within a high pressure region of the first chamber, said one or more electrical conductors are arranged to extend within a wall region of the housing from a high pressure region of the first chamber to said low pressure region before exiting the housing from said low pressure region, whereby any leakage of fuel around the one or more electrical conductors from the high pressure region will drain into the low pressure region of the first chamber, avoiding fuel leakage to the exterior of the housing. Also, the housing is over-moulded over the electrical conductors. This avoids the need for complex sealing methods around the conductors and thus provides cost and time savings during assembly.

In one embodiment the first chamber is substantially cylindrical or tubular in shape. Also, at least a portion of the housing defining the first chamber may be formed from a plastic material, or the entire housing may be formed from a plastic material.

the positive displacement pump assembly may comprise first and second pump casing parts defining between them a pumping chamber within which an impeller is rotatably mounted, the impeller being engageable with an output shaft of the electric motor to be rotatable thereby. One of said first and second casing parts may comprise part of an end cap of the housing and may be integrally formed therewith. The pump may be a gerotor type positive displacement pump such as described in U.S. patent application Ser. No. 08/080,248.

Typical fuel pumps for automotive use comprise an electric motor and a positive displacement pump assembly enclosed within a cylindrical casing, said casing comprising a rolled metal shell caulked or rolled over the ends of the motor and pump assembly to maintain the components in place. It is desirable to use a plastic housing to retain and enclose the motor and pump assembly, both for ease of assembly and light weight. However, plastic materials typically absorb fuel and expand thereby, making it difficult to maintain sufficient axial load on the pump assembly to ensure correct operation.

In one embodiment of the present invention, a biasing means is provided within the first chamber for biasing the first and second pump casing parts together to ensure correct operation of the pump assembly. This biasing means may comprise a compression spring. The biasing means may be situated between the electric motor and an end of the first chamber remote from said pump assembly whereby the motor is urged towards the pump assembly to bias the first and second parts of the pump assembly together. Intermediate spacer means may be provided between the electric motor and the end of the first chamber.

By replacing the metal shell with a plastic housing and adding a biasing means to place an axial load on the impellor, correct operation of the pump is ensured, irrespective of expansion of the housing due to fuel adsorption and/or thermal effects.

As discussed above, packaging constraints lead to difficulties in arranging and interconnecting the various components of the fuel delivery system, such as the fuel pump, fuel filter and pressure regulator.

Thus, according to a preferred embodiment of the present invention, a fuel filter and/or a fuel pressure regulator may be provided within the housing. In one embodiment a fuel filter is provided within a second chamber defined within the housing, said second chamber being in fluid communication with said first chamber, whereby said second chamber is adapted to receive the fuel filter and is provided with a detachable closure means to permit replacement of the fuel filter and wherein the fuel outlet of the housing communicates with said second chamber. Said detachable closure means may be provided by a detachable end cap of the housing, and the fuel outlet may be formed in said detachable end cap of the housing.

In one embodiment of the invention, the fuel filter is arranged within the second chamber such that fuel passing into the second chamber from the first chamber must pass through the filter before passing out of the fuel outlet.

A check valve may be provided between the first and second chambers, permitting fuel flow from the first chamber to the second chamber while preventing fuel flow from the second chamber to the first chamber.

A fuel pressure regulator may be provided within a third chamber defined within the housing, said third chamber being in fluid communication with the second chamber and being provided with a fuel drain outlet, the fuel regulator controlling communication between said second chamber and the fuel drain outlet to permit flow from the second chamber to the drain outlet only when the fuel pressure within the second and/or third chambers exceeds a predetermined threshold. In one embodiment, said second and third chambers each have a longitudinal axis, the longitudinal axis of the second chamber being substantially coaxial with the longitudinal axis of the second chamber and the longitudinal axis of the second and third chambers are substantially parallel to a longitudinal axis of the first chamber. In an alternative embodiment, the fuel filter and fuel pressure regulator may be both provided within the housing at or adjacent one end of the fuel pump Thus the preferred embodiment of the present invention provides an integrated module comprising a single housing containing the major components of the fuel delivery system that is compact, light, easily manufactured and readily serviceable to meet the requirements of small vehicle applications. While the fuel pump, fuel filter and pressure regulator are described as being located in separate, albeit intercommunicating, chambers, it is envisaged that two or more of such components may be provided in a common chamber within the housing.

Electric fuel pumps for motor vehicles commonly include a metal outer housing or shell, a pump in the shell at one end thereof, an end housing in the shell at the other end thereof, and an electric motor in the shell between the pump and the end housing. The electric motor consists of an armature supported on the shell for rotation about a longitudinal centreline thereof and a magnet assembly around the armature including a tubular cylindrical flux carrier between the pump and the end housing and a pair of permanent field magnets. Current is conducted to the armature through brushes on the end housing bearing against a commutator on the armature in a plane perpendicular to the longitudinal centreline of the shell.

To correctly locate the magnets angularly relative to the brushes around the inner surface of the flux carrier it is known to provide a spacer member, locatable between adjacent field magnets, for defining a correct separation between the field magnets, and a spring member for location between the magnets on a side opposite to the spacer. Such an arrangement is disclosed in U.S. Pat. No. 3,391,063. However, such known arrangements comprise a number of small components that require sequential assembly leading to a slow and laborious assembly procedure.

Thus, advantageously, there is provided an electric motor assembly for a fuel pump, the motor assembly comprising a rotor supported for rotation within a tubular ferromagnetic flux carrier, a plurality of field magnets being located on an inner wall of said flux carrier to conform to the curvature of said inner wall, a support member provided at one end of the motor assembly, said support member having a plurality of elongate spacer members extending therefrom, each spacer member being arranged to extend between the flux carrier and the rotor and locate between adjacent pairs of field magnets of the electric motor, at least one of said spacer members having an elongate aperture or slot formed therein arranged substantially coaxial with or parallel to a longitudinal centreline of the spacer member to permit resilient compression of at least a portion of said at least one spacer member in a circumferential direction normal to said longitudinal axis to provide a circumferential biasing force against the field magnets to accurately locate the field magnets against the inner surface of the flux carrier.

Each of the plurality of spacer members may be provided with an elongate aperture or slot. In one embodiment, a central region of the at least one spacer member has a circumferential width greater than that of the end regions thereof whereby the central region of each locating finger can be resiliently compressed in the circumferential direction during insertion between adjacent field magnets to provide a circumferential bias to hold the field magnets in place against the inner surface of the flux carrier.

The support member may provide support for brushes arranged to cooperate with a commutator on the rotor to supply electricity to the rotor.

BRIEF DESCRIPTION OF THE DRAWINGS

Embodiments of the present invention will now be described, by way of example only, with reference to the accompanying drawings, in which:

FIG. 4a is a perspective view of the electric motor assembly of the module of FIG. 1;

FIG. 4b is an exploded view of the electric motor assembly of FIG. 4a;

FIG. 4c is a perspective view of part of the electric motor assembly of FIG. 4a;

DETAILED DESCRIPTION OF THE INVENTION

Figure 6:
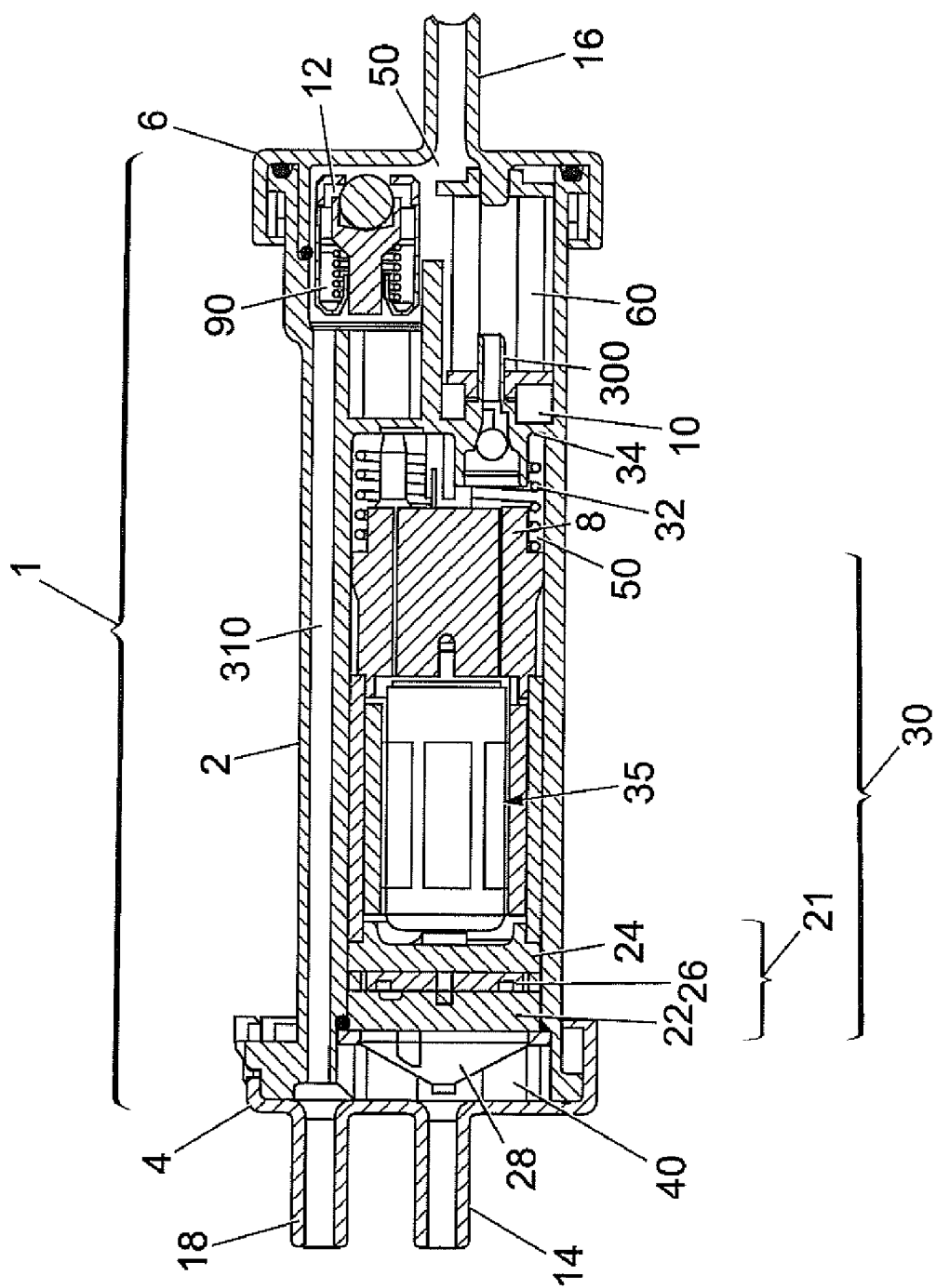
FIG. 6 is a longitudinal sectional view of a fuel delivery module according to a second embodiment of the present invention.
Figure 7:
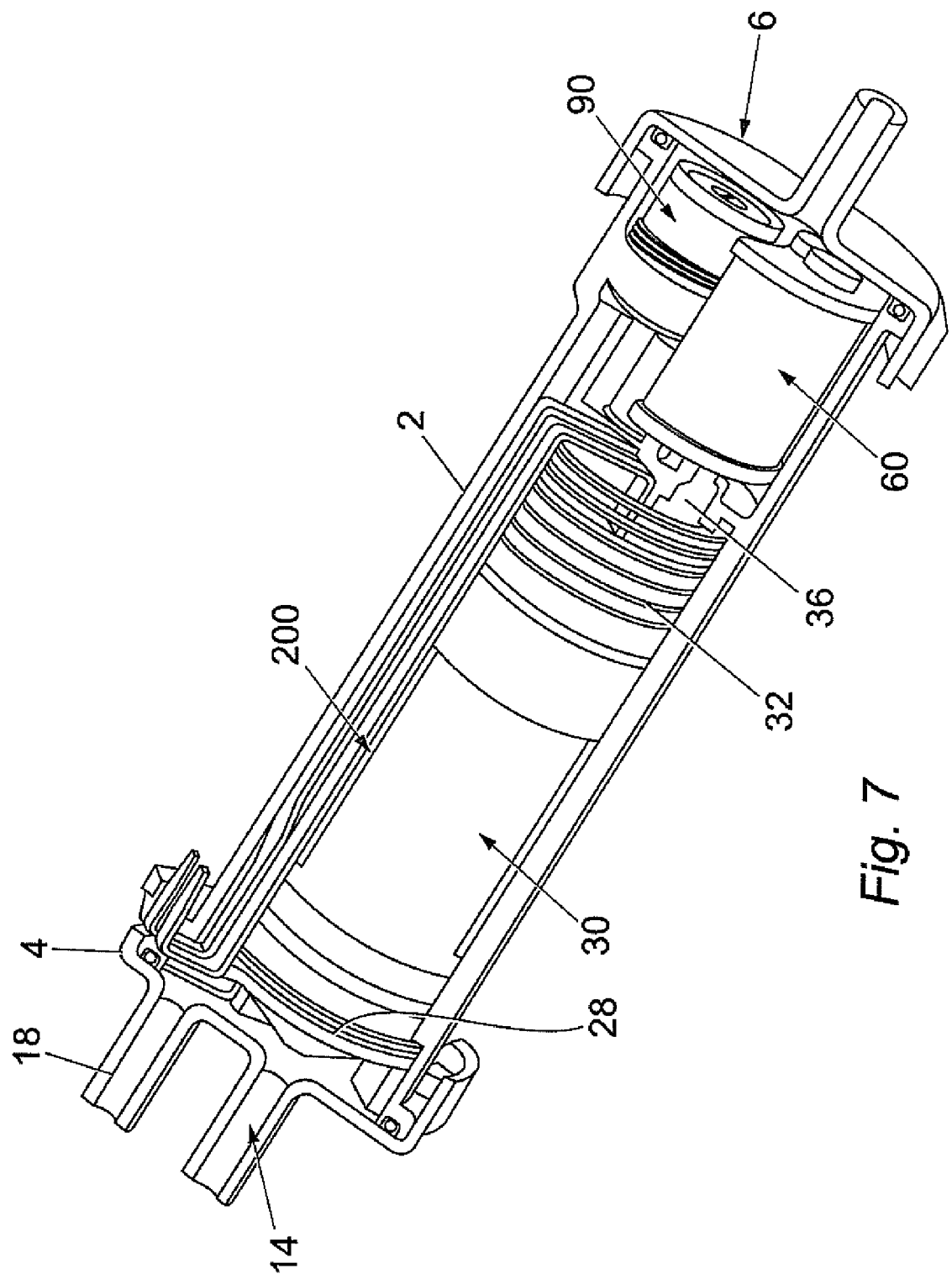
FIG. 7 is a perspective part sectional view of the module of FIG. 6.

FIGS. 1 to 5 illustrate a fuel delivery module 1 for supplying fuel from a fuel tank of a small vehicle, such as a motorcycle, scooter, small watercraft or snow mobile, to an engine of the vehicle. FIGS. 6 and 7 illustrate a fuel delivery module 1 according to a second embodiment, differing principally in the arrangement of the fuel pump 30, fuel filter 60 and fuel pressure regulator 90 within the housing. The same reference numerals will be used to describe corresponding features in each of the two embodiments.

With reference to FIGS. 1 to 5, a fuel delivery module 1 according to the present invention comprises a housing comprising a hollow body 2 having first and second ends caps 4,6 releasably secured to respective ends of the body 2 to form a closed, fuel tight assembly. The housing defines a first chamber 8 adapted to receive a fuel pump 30, a second chamber 10 adapted to receive a fuel filter 60 and a third chamber 12 adapted to receive a fuel pressure regulator 90. The housing is formed from a plastic material.

A fuel inlet 14 is provided on the first end cap 4 of the housing communicating with the first chamber for supplying low pressure fuel from a vehicle fuel tank to the fuel pump 30. A fuel outlet 16 is provided on the second end cap 6 communicating with the second chamber downstream of the fuel filter 60 for supplying high pressure fuel to the fuel system of a vehicle engine. A drain outlet 18 is provided on the first end cap 4, spaced from the fuel inlet and communicating with the third chamber 12 downstream of the fuel pressure regulator 90 for returning excess fuel to the fuel tank.

Cooperating releasable fastening means 20 are provided on the end caps 4,6 and the housing body 2 to releasably secure the end caps 4,6 to the body 2 of the housing. As can be seen from FIG. 2, O-ring seals 5 are provided between the housing body 2 and the end caps 4,6 to prevent fuel leakage.

The first chamber 8 of the housing is adapted to receive the fuel pump 30. The fuel pump 30 includes a positive displacement pump assembly 21 comprising first and second pump casing halves 22,24 having a pumping chamber defined therebetween containing an impeller 26. The impeller 26 is mounted on an output shaft of the rotor of an electric motor assembly 35 to be rotatably driven thereby to pump fuel from a low pressure region 40 of the first chamber 8 adjacent the fuel inlet 14 to a high pressure region 50 of the first chamber 8 downstream of the pump assembly 21. A fuel strainer 28 is provided in the first chamber 8 upstream of the pump assembly 21.

In order to ensure correct operation of the pump assembly 21, a compression spring 32 is provided between the electric motor assembly 35 and an end wall 34 of the first chamber 8 defining the boundary between the first chamber 8 and the second chamber 10 to bias the motor assembly 35 against the pump assembly 21 to urge the two halves of the pump casing 22,24 together, avoiding the need for a rolled metal shell to provide the required accurate axial alignment of the components. Thus, manufacture and assembly of the fuel module is made easier and any expansion of the housing and other components of the fuel module due to adsorption of fuel and/or temperature changes can occur without affecting the performance of the fuel pump.

A check valve 36 is provided in the end wall 34 between the first and second chambers 8,10 for allowing fuel to flow from the first chamber 8 to the second chamber 10 while preventing return fuel flow from the second chamber 10 to the first 8.

Figure 1:
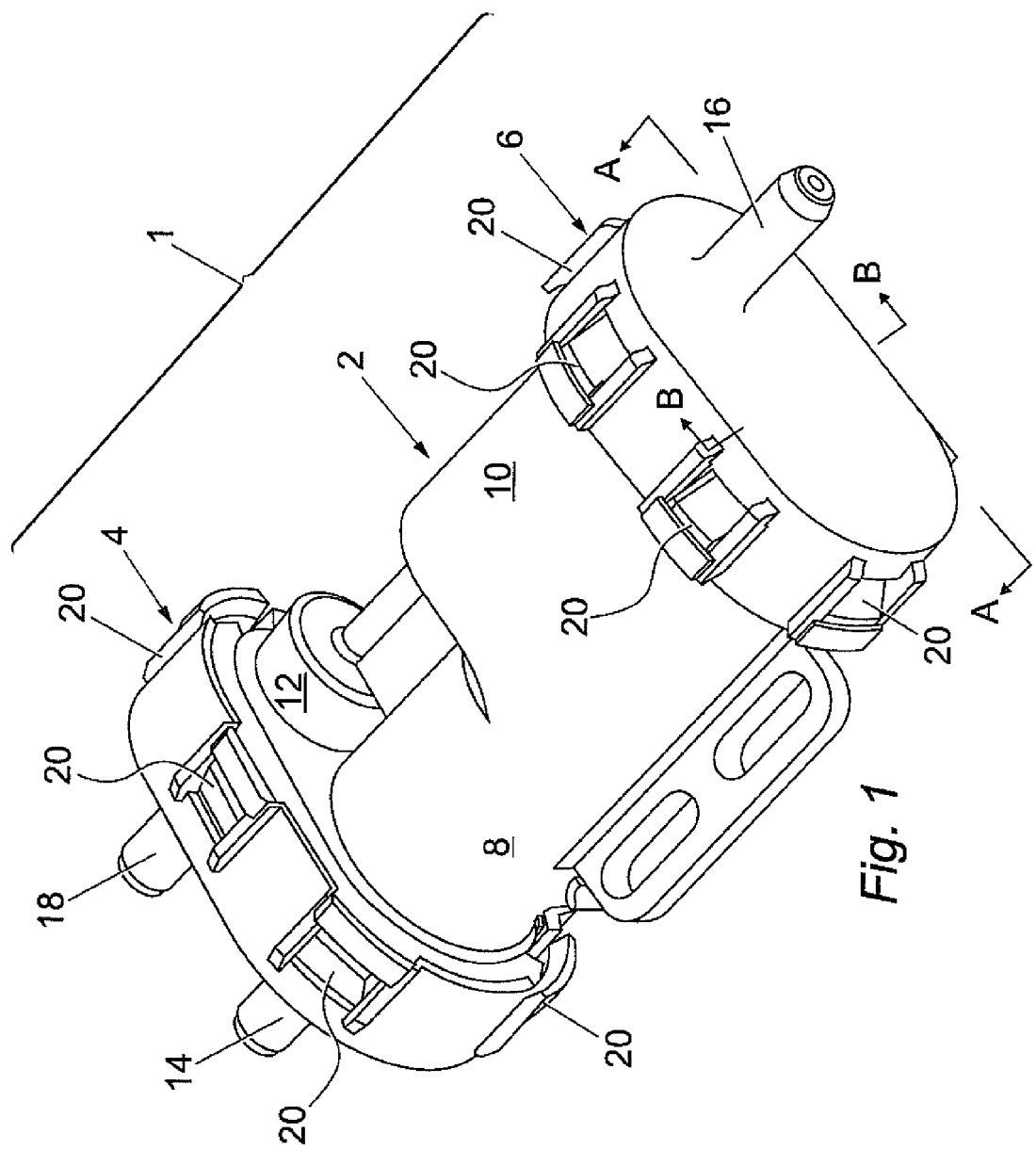
FIG. 1 is a perspective view of a fuel delivery module according to one embodiment of the present invention.
Figure 2:
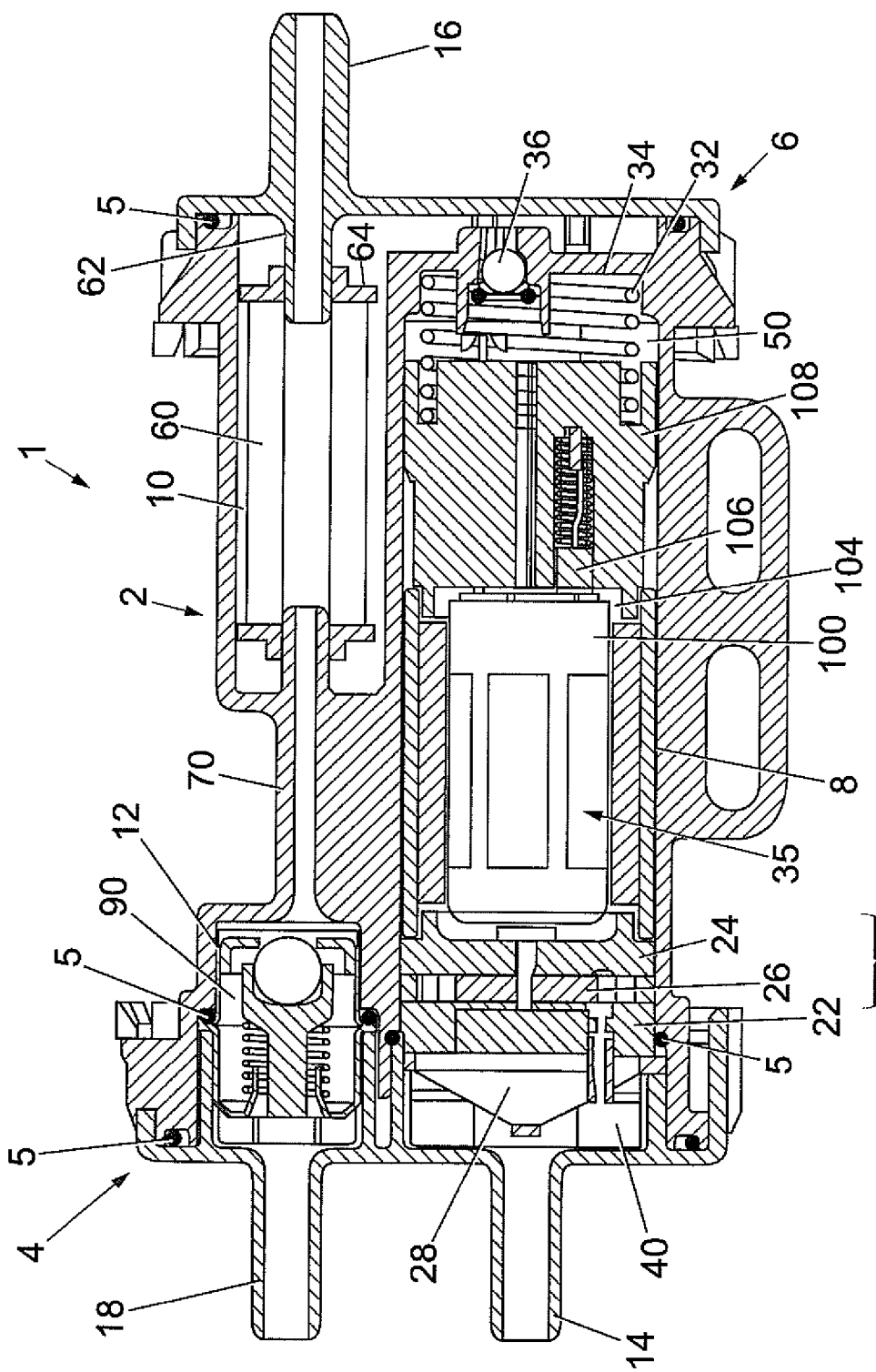
FIG. 2 is a sectional view of the module of FIG. 1 along line A-A.
Figure 3:
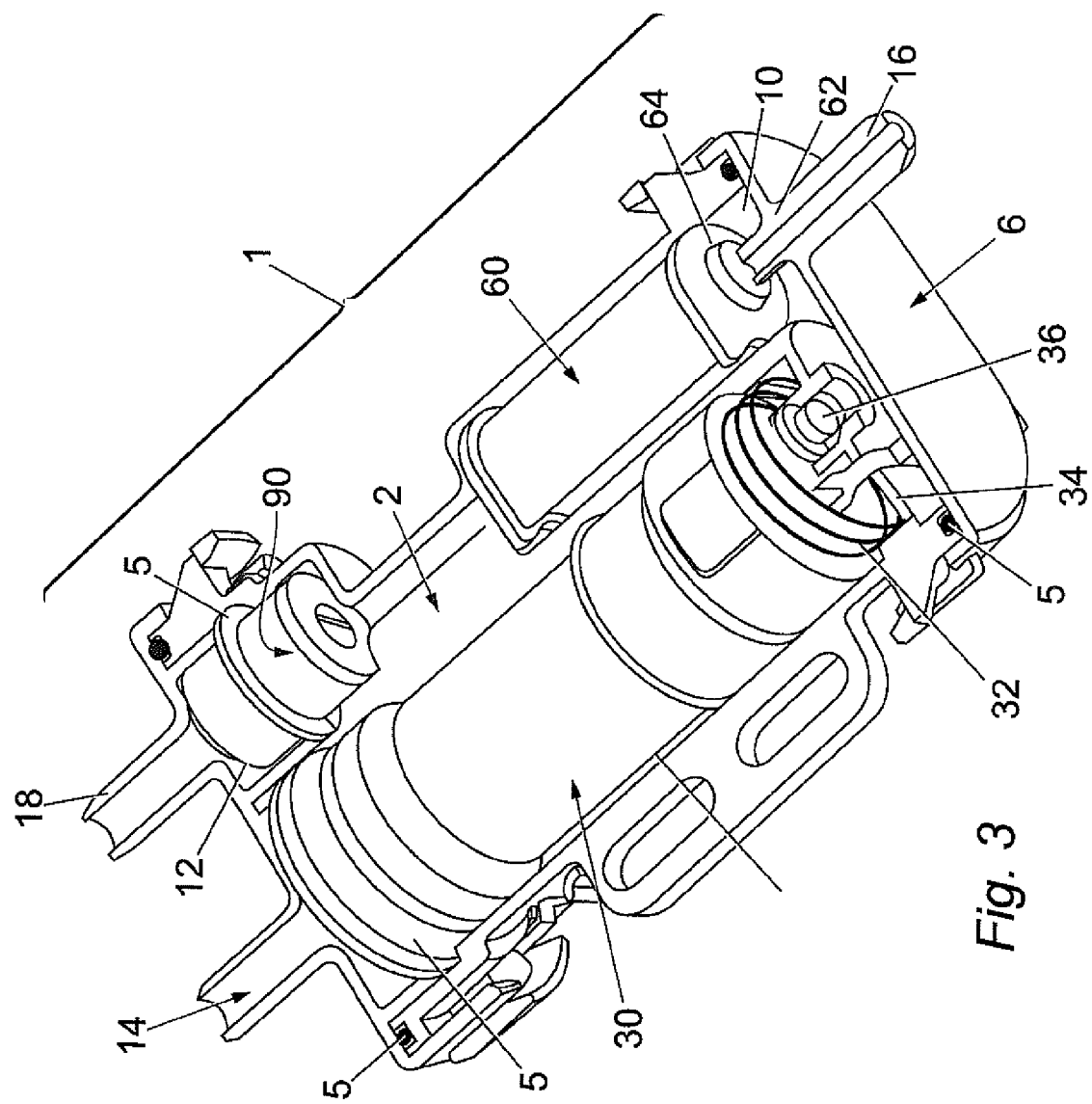
FIG. 3 is a perspective part sectional view of the module of FIG. 1.

As can be seen from FIGS. 2 and 3, the fuel filter 60 is located within the second chamber 10 to filter fuel from the first chamber 8 before it can pass out through the fuel outlet 16. To achieve this, an extension 62 of the fuel outlet 16 extends into the second chamber 10 from the end cap 6 to enter into an aperture 64 in one end of the fuel filter 60.

The end cap 6 of the housing is readily detachable by means of the releasable fastening means 20 to enable replacement of the filter 60, when required.

The second chamber 10 communicates with the third chamber 12 via an elongate fuel passageway 70. The fuel pressure regulator 90 is located in the third chamber 12 between the fuel passageway 70 and the drain outlet 18 to allow fuel to flow to the drain outlet when the fuel pressure downstream of the fuel pump 30 exceeds a predetermined threshold. The fuel pressure regulator 90 is conventional in the art and thus need not be described in more detail.

The electric motor assembly 35, as illustrated by FIGS. 4a, 4b and 4c and with reference to FIG. 2, comprises a rotor or armature 100 having a plurality of circumferentially spaced motor windings 102 and a commutator portion 104. A pair of carbon brushes 106 are supported in a base 108 of the motor assembly 35 to deliver electrical power to the motor windings 102.

A flux carrier 110 in the form of a cylindrical ferromagnetic tube is mounted on the base 108 to surround the armature 100. One end of the flux carrier 110 bears against a lip on the base 108 and the other end of the flux carrier 110 bears against an end face of one half 24 of the pump casing.

A pair of permanent magnets 112,114 are concentrically located between the flux carrier 110 and the armature 100. In order to accurately locate the magnets 112,114 around the armature 100, the base portion is provided with a pair of locating fingers 116,118 integrally formed therewith and extending therefrom to extend between the flux carrier 110 and armature 100 to correctly position the magnets 112,114 on the inner surface of the flux carrier 110 with respect to the base 108.

In order to accurately locate the magnets 112,114 on the inner surface of the flux carrier 110 and to maintain such location, the central region of each of the locating fingers 116,118 has a circumferential width greater than that of the end regions and each locating finger 116,118 is provided with an elongate axial slot 120,122 running approximately along the elongate centre line thereof whereby the central region of each locating finger 116,118 can be resiliently compressed in the circumferential direction during insertion between the magnets 112,114 to provide a circumferential bias to hold the magnets in place against the inner surface of the flux carrier 110.

Thus assembly of the electric motor assembly 35 is greatly facilitated when compared to the prior art arrangement requiring the insertion of at least one separate spring clip.

Figure 5:
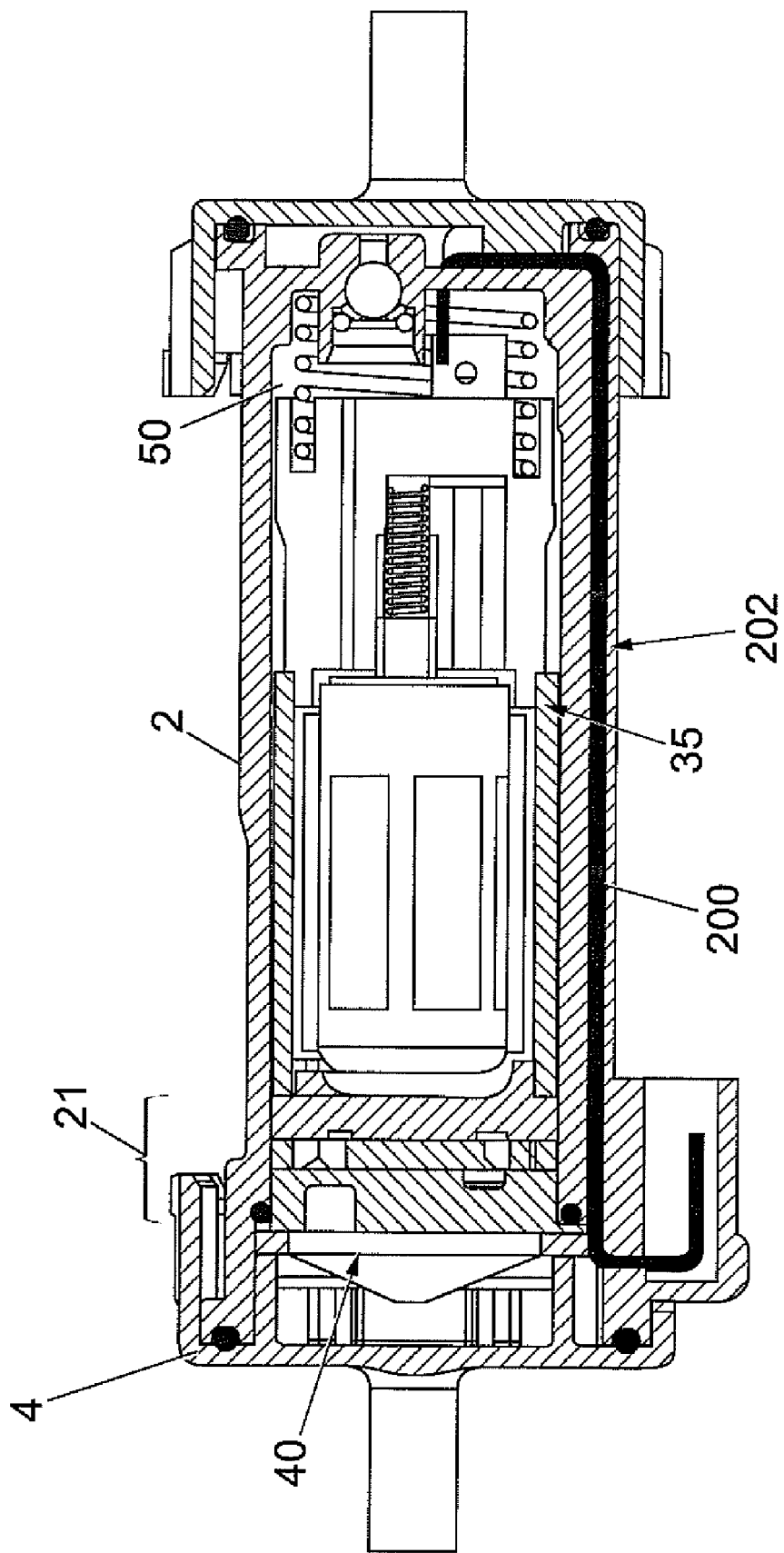
FIG. 5 is a sectional view of the module of FIG. 1 along line B-B.

FIG. 5 illustrates an advantageous arrangement of the electrical conductors 200 for supplying electrical energy to the motor assembly 35.

In order to connect a supply of electricity to the motor assembly 35 it is necessary for the electrical conductors 200 to pass through the fuel module housing. Because the brushes and commutator of the motor assembly are located in the high pressure region 50 of the interior of the housing, the path of the conductors through the housing can create a leak path leading to fuel leakage from housing.

In the preferred embodiments of the present invention this leakage is avoided by arranging the electrical conductors 200 to pass from the high pressure region 50 of the first chamber 8 to the low pressure region 40 through a wall region 202 of the body 2 of the housing, before exiting the housing from the low pressure region 40, whereby any fuel leakage along the path of the electrical conductors 200 can pass from the high pressure region 50 of the first chamber 8 (and the housing by virtue of the communication between the first, second and third chambers) to the low pressure region 40 of the first chamber 8.

To locate the electrical conductors 200 within the wall region 202 of the body 2 of the housing, it is envisaged that the body 2 of the housing might be over-moulded over the electrical conductors 200.

FIGS. 6 and 7 illustrate an alternative embodiment of the present invention wherein the fuel filter 60 and fuel pressure regulator 90 are both located within the housing to one end of the fuel pump 30, rather than being arranged substantially parallel to the fuel pump 30 as in the first embodiment. All of the other features of the pump module are substantially the same as those of the first embodiment other than the above-mentioned arrangement of the components. A coil spring 32 is again provided in the first chamber 8 between an end wall 34 of the first chamber 8 and the motor assembly 35 of the fuel pump 30.

Due to the arrangement of the components in the second embodiment, the direction of fuel flow through the filter 60 is effectively reversed when compared to the first embodiment, fuel entering a central region of the filter 60 from the first chamber 8 through a spigot 300 extending from a wall of the second chamber adjacent the first chamber and passing out of the filter through the filtration material forming the side walls of the filter 60.

Fluid communication between the second chamber 10 and third chamber 12 of the housing is provided by means of a radial passage defined between the body 2 of the housing and the end cap 6 and communication between the third chamber 12 downstream of the fuel pressure regulator 90 and the drain outlet 18 is provided by an elongate fluid passageway 310 extending alongside and parallel to the first chamber 8.

As illustrated by the above described preferred embodiments, the present invention provides a compact and light-weight fuel delivery module that is easy to assemble, cheap to manufacture and which overcomes the disadvantages of the prior art to render the module particularly suitable for use in small vehicles, such as motorcycles, scooters, light watercraft and snow mobiles.

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

The invention claimed is:

1. A fuel delivery module comprising a substantially fuel tight housing having a fuel inlet and at least one fuel outlet, a fuel pump located in a first chamber defined within the housing, said fuel pump comprising an electric motor and a positive displacement pump assembly drivingly connected to the motor for pumping fuel from the fuel inlet to said fuel outlet, at least a substantial part of said housing being formed from a plastic material, wherein one or more electrical conductors for supplying electrical energy to the electric motor exit through a wall region of the housing surrounding or adjacent a lower pressure region of the first chamber to be connectable to an electrical connector, characterized in that the electrical conductors are connectable to the electric motor within a high pressure region of the first chamber, said one or more electrical conductors being arranged to extend within a wall region of the housing from a high pressure region of the first chamber to said low pressure region before exiting the housing from said low pressure region, whereby any leakage of fuel around the one or more electrical conductors from the high pressure region will drain into the low pressure region of the first chamber, avoiding fuel leakage to the exterior of the housing.

2. A fuel delivery module as claimed in claim 1, wherein the housing is over-moulded over the electrical conductors.

3. A fuel delivery module as claimed in claim 2, wherein the first chamber is substantially cylindrical or tubular in shape.

4. A fuel delivery module as claimed in claim 3, wherein at least the portion of the housing defining the first chamber is formed from a plastic material.

5. A fuel delivery module as claimed in claim 2, wherein at least the portion of the housing defining the first chamber is formed from a plastic material.

6. A fuel delivery module as claimed in claim 1, wherein the first chamber is substantially cylindrical or tubular in shape.

7. A fuel delivery module as claimed in claim 6, wherein at least the portion of the housing defining the first chamber is formed from a plastic material.

8. A fuel delivery module as claimed in claim 1, wherein at least the portion of the housing defining the first chamber is formed from a plastic material.

9. A fuel delivery module as claimed in claim 1, wherein the positive displacement pump assembly comprises first and second pump casing parts defining between them a pumping chamber within which an impeller is rotatably mounted, the impeller being engageable with an output shaft of the electric motor to be rotatable thereby.

10. A fuel delivery module as claimed in claim 9, wherein one of said first and second casing parts comprises part of an end cap of the housing.

11. A fuel delivery module as claimed in claim 10, wherein a biasing means is provided within the first chamber for biasing the first and second pump casing parts together to ensure correct operation of the pump assembly.

12. A fuel delivery module as claimed in claim 11, wherein said biasing means comprises a compression spring.

13. A fuel delivery module as claimed in claim 12, wherein said biasing means is provided between the electric motor and an end of the first chamber remote from said pump assembly whereby the motor is urged towards the pump assembly to bias the first and second parts of the pump assembly together.

14. A fuel delivery module as claimed in claim 11, wherein said biasing means is provided between the electric motor and an end of the first chamber remote from said pump assembly whereby the motor is urged towards the pump assembly to bias the first and second parts of the pump assembly together.

15. A fuel delivery module as claimed in claim 9, wherein a biasing means is provided within the first chamber for biasing the first and second pump casing parts together to ensure correct operation of the pump assembly.

16. A fuel delivery module as claimed in claim 15, wherein said biasing means comprises a compression spring.

17. A fuel delivery module as claimed in claim 16, wherein said biasing means is provided between the electric motor and an end of the first chamber remote from said pump assembly whereby the motor is urged towards the pump assembly to bias the first and second parts of the pump assembly together.

18. A fuel delivery module as claimed in claim 15, wherein said biasing means is provided between the electric motor and an end of the first chamber remote from said pump assembly whereby the motor is urged towards the pump assembly to bias the first and second parts of the pump assembly together.

* * * * *